Jan. 10, 1961 J. K. GARTSEF 2,967,443
MACHINE TOOL ACCESSORY
Filed April 9, 1959 2 Sheets-Sheet 1

INVENTOR.
Jordan K. Gartsef
BY Robert C. Camp
Attorney

Jan. 10, 1961  J. K. GARTSEF  2,967,443
MACHINE TOOL ACCESSORY
Filed April 9, 1959  2 Sheets-Sheet 2
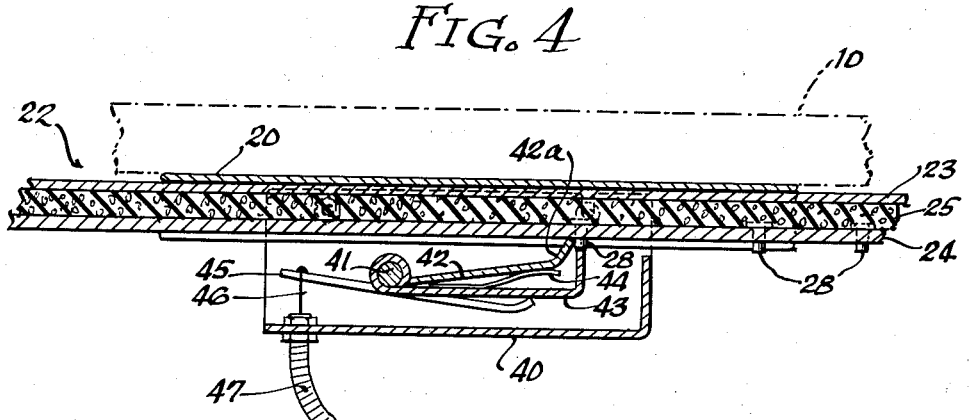
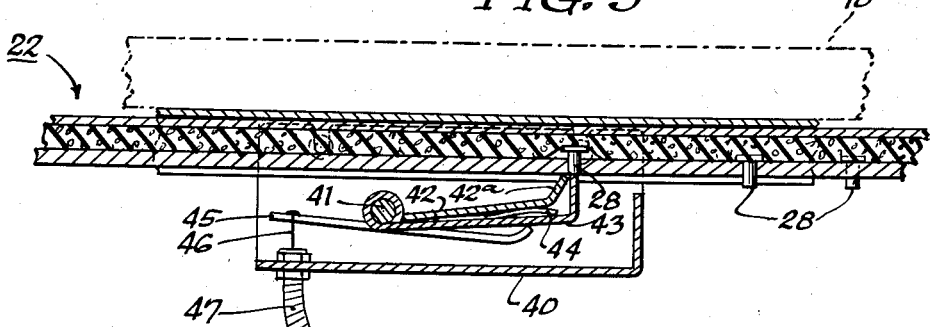
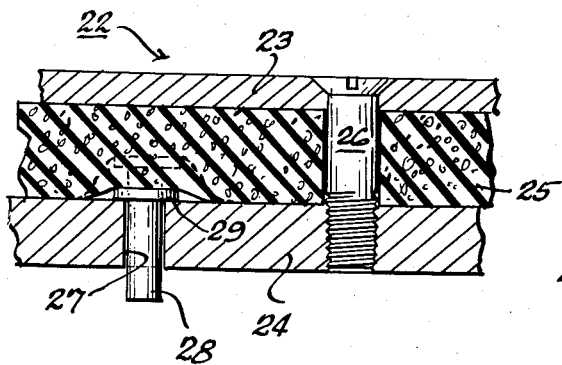
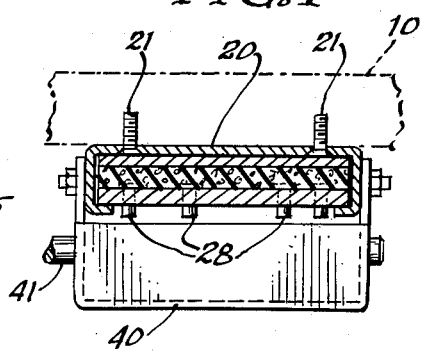
INVENTOR.
Jordan K. Gartsef
BY Robert C. Camp
Attorney

2,967,443
MACHINE TOOL ACCESSORY

Jordan K. Gartsef, 926 N. Walcot, Chicago, Ill.

Filed Apr. 9, 1959, Ser. No. 805,265

13 Claims. (Cl. 77—64)

This invention relates to a machine tool accessory for facilitating rapid and accurate placement of a succession of work pieces in a series of predetermined positions on a machine tool work table, and it is an object of the invention to provide improved apparatus of this character.

Previously known devices of this type have suffered from various undesirable characteristics. A common fault is that the apparatus is complicated in construction and, therefore, expensive to manufacture. Frequently, apparatus of this type is intended to be incorporated within a machine tool as originally constructed, and is not readily attachable to and usable with a previously constructed machine tool. In other cases of prior art devices of this character, the apparatus obstructs the working area of the work table and reduces the size of the largest work piece that can be handled by the machine tool. Other previously known apparatus does not permit finely differentiated stop positions, is inaccurate, unreliable and/or difficult to adjust.

Apparatus constructed in accordance with the present invention may be mounted in various positions on an existing machine tool and is preferably secured to the bottom of the work table such that it does not obstruct the working area. It includes a substantially unlimited number of stop elements which are quickly and easily positioned in any of a large number of finely differetiated positions. These features of the apparatus, along with great accuracy and reliability, are obtained even though the apparatus is very simple in construction and economical to manufacture.

Accordingly, it is another object of the invention to provide improved apparatus which facilitates rapid and accurate placement of a succession of work pieces in a series of predetermined positions on a machine tool work table, and which is readily attachable to existing machine tools.

It is a further object of the invention to provide improved apparatus of the character specified above which is readily secured to the bottom of a machine tool work table such that it does not obstruct the upper, working surface of the work table.

It is a still further object of the invention to provide improved apparatus of the character described above which facilitates accurate positioning of a work piece in finely differentiated stop positions.

Another object of the invention is to provide improved apparatus of the character described above which is easily released to permit movement of a work piece from one predetermined work position to the next and which permits quick and easy adjustment of the predetermined work positions.

Still another object of the invention is to provide improved apparatus of the character described above and having various of the features specified above while being accurate and reliable in operation and economical to manufacture.

Further features of the invention pertain to the particular arrangement of the elements of the machine tool accessory, whereby the above outlined and additional features thereof are attained.

The invention, both as to its organization and method of operation, together with further objects and advantages thereof, will best be understood by reference to the following specification, taken in connection with the accompanying drawings, in which:

Fig. 4 is an enlarged cross-sectional view taken in the direction of the arrows along the line 4—4 of Fig. 3;

Fig. 5 is a cross-sectional view similar to Fig. 4 but illustrating the apparatus in a different operating position;

Fig. 6 is a greatly enlarged, partial cross-sectional view taken in the direction of the arrows along the line 6—6 of Fig. 1; and, Fig. 7 is an enlarged cross-sectional view taken in the direction of the arrows along the line 7—7 of Fig. 1.

Figure 1:
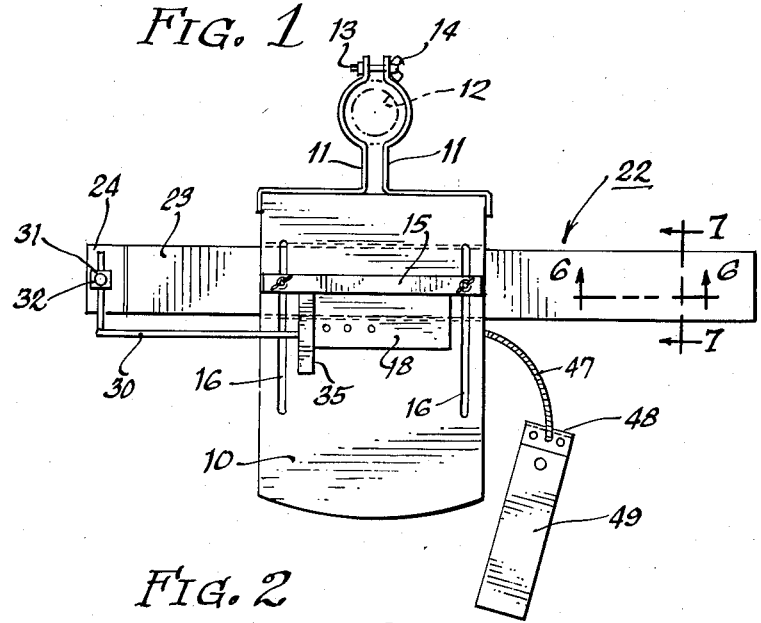
Figure 1 is a top plan view of a machine tool accessory constructed in accordance with the present invention and mounted on a machine tool work table.

The apparatus shown in the drawings and embodying the present invention is shown mounted on a work table 10 of a machine tool such as a drill press. Arms 11 support the work table at adjustable height on a column 12 of the machine tool. A bolt 13 and a wing nut 14 serve to clamp the arms 11 against the column 12 with the work table 10 at the desired height, all as is conventional in the art.

An adjustable slide stop 15 is arranged on the upper surface of the work table 10. Suitable slots 16 are provided in the work table for receiving fastening means, not detailed in the drawings, for securing the slide stop 15 in adjusted position. A work piece 18 may be arranged against the slide stop 15 such that the work piece is properly positioned in one direction on the work table. Apparatus incorporating the present invention serves to facilitate quick and accurate positioning of the work piece 18 in a series of selected positions spaced apart in a direction parallel to the slide stop 15.

Figure 3:
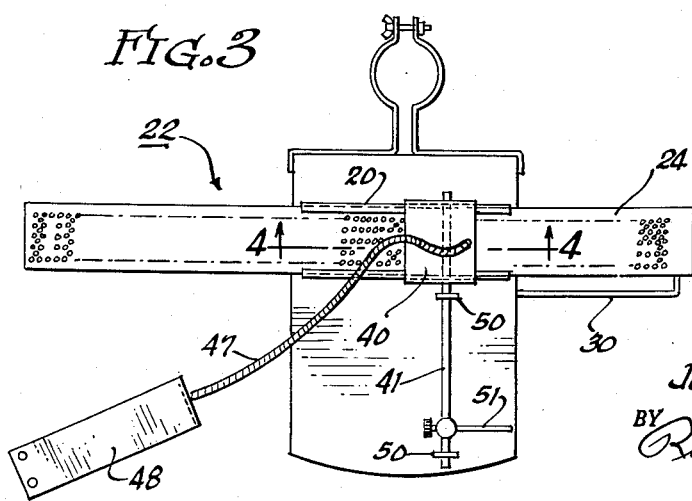
Fig. 3 is a bottom plan view of the same apparatus.

As is seen best in Figs. 3 and 7, a channel-shaped guide member 20 is secured to the bottom of the work table 10 as by a plurality of screws 21 whose heads are recessed in the web portion of the channel-shaped guide member. The guide member 20 preferably extends the full width of the work table 10 and may be provided with suitable openings for receiving the screws 21 anywhere along the length thereof such that the screws may be threadedly received within tapped openings in the bottom of the work table.

An elongated bar 22 is slidably received within the guide member 20 such that the bar is free to slide longitudinally of itself and laterally with respect to the work table. This bar comprises upper and lower metal plates 23 and 24 respectively with an intermediate layer 25 of sponge rubber or other flexible and resilient material. A plurality of screws 26 (see Fig. 6) are provided for releasably securing the plates 23 and 24 against the layer 25 of sponge rubber, such that the rubber is slightly compressed therebetween. If desired, rigid spacers may be provided at selected points between the metal plates 23 and 24 whereby the screws 26 may be drawn up tight, with the compression of the layer 25 of the sponge rubber being controlled by the thickness of the rigid spacers.

The lower plate 24 is provided with a large number of openings 27 which are preferably arranged in staggered rows, as shown in Fig. 3. With this arrangement, fine spacing of the openings 27, longitudinally of the bar 22, may be obtained.

A plurality of pins 28 may be arranged in selected ones of the openings 27 by disassembly of the bar 22. Upon removal of the screws 26 and lifting of the plate 23 and the rubber sheet 25 from the plate 24, any desired number of pins 28 may be arranged in selected openings 27, the pins 28 having heads 29 which prevent their passage through the openings 27. The various elements of the bar 22 are then reassembled whereupon the layer of rubber 25 bears against the heads 29 of the pins 28 and urges the pins resiliently outwardly such that their free ends extend beyond the lower surface of the plate 24, as shown in Fig. 6. Pressure against the outer or free end of a pin 28 causes compression of the layer 25 of rubber and retraction of the pin 28 to the position illustrated by phantom lines in Fig. 6.

Figure 2:
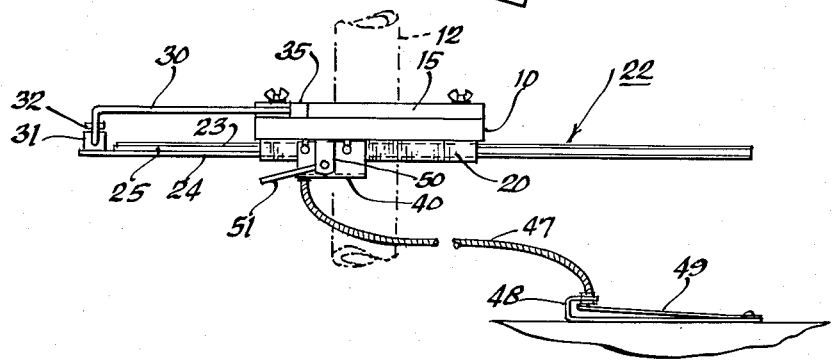
Fig. 2 is a front elevational view of the apparatus shown in Fig. 1.

A stop arm 30 is adjustably secured to the left hand end of the arm 22, as best seen in Figs. 1 and 2. One end of this stop arm is slidably received within a block 31 which is secured to the upper surface of the lower plate 24 of the arm 22, the upper plate 23 of the arm 22 terminating short of the left hand end of the lower plate 24 as is clearly shown in Figs. 1 and 2. A thumb screw 32 is threadedly received in the upper portion of the block 31 and may be tightened against that portion of the stop arm 30 which is slidably received within the block 31, whereby the stop arm 30 may be firmly held in adjusted position.

In the illustrated embodiment of the invention, this adjustability of the stop arm 30 permits sliding adjustment of the stop arm perpendicular to the length of the bar 22 in a horizontal plane and permits pivotal movement of the stop arm such that the elevation of the free end of the stop arm may be adjusted. The apparatus is, therefore, adjustable to different positions of the slide stop 15 and to work tables of different thicknesses. A stop bar 35 is secured to the free end of the stop arm 30 in any suitable manner, this stop bar 35 preferably extending parallel to the upper surface of the work table 10 and perpendicular to the adjustable slide stop 15.

Apparatus constructed in accordance with the present invention includes means for interrupting sliding movement of the bar 22 and, hence, of the stop bar 35, such that a work piece 18 may readily be brought to a predetermined position on the work table 10. The stop means are readily releasable such that following the completion of a machining operation on the work piece 18, the work piece may readily be moved to the next successive stop position for another machining operation. The stop means include a frame 40 which is releasably secured to the guide member 20 in any suitable manner.

A shaft 41 is rotatably supported in opposed sides of the frame 40 and an L-shaped stop member 42 is arranged to pivot freely about the shaft 41 and has an upwardly extending leg 42a engageable with the lower surface of the bar 22. Preferably the leg 42a is oriented at a substantial angle to the vertical as shown in Figs. 4 and 5 for reasons which will subsequently become apparent.

An L-shaped release member 43 is also arranged to pivot about the shaft 41 and has an upwardly extending leg engageable with the lower surface of the bar 22 immediately adjacent the line of engagement with leg 42a of the stop member 42. A leaf spring 44 is arranged between the stop member 42 and the release member 43 and urges them apart. The stop member 42 is thereby urged toward the bar 22 and the release member 43 is urged away from the bar 22.

An operating lever 45 is secured to the shaft 41 and has a right hand arm underlying the release member 43 and a left hand arm operable by a release cable 46. The cable 46 extends through a flexible sleeve 47, this sleeve being anchored to the frame 40 and to a frame 48 which supports a pivoted foot lever 49. The other end of the cable 46 is secured to the free end of the foot pedal 49.

In the illustrated embodiment of the invention means are also provided for hand operation of the release member 43. For this purpose, the shaft 41 is arranged to extend beyond the frame 40 and through a pair of bearings or guides 50, a handle 51 being adjustably secured to the shaft 41 in any suitable manner.

A typical operation of the illustrated apparatus is now described in the interest of a fuller understanding of the invention. Let it be assumed that the machine tool of which the work table 10 forms a part is a drill press and that a large number of work pieces 18 are to be provided with two or more drilled holes arranged two inches apart along the center line of the work piece.

The slide stop 15 is first positioned such that the work piece 18 may be arranged thereagainst with its center line lying directly below the drill. Pins 28 are then arranged in openings 27 in the lower plate 24 of the bar 22, the pins being arranged two inches apart as measured along the length of the bar 22.

With the bar 22 at its extreme right hand position, it may be slid to the left until the first pin 28 engages the stop member 42 to halt leftward movement of the bar. With the position of the first pin 28 having been properly selected, the stop bar 35 is then properly positioned for the first drilling operation. More specifically, a work piece 18 may be laid on the work table 10, moved against the slide stop 15 and slid to the left against the stop bar 35. The first drilling operation is then effected.

After the drill has been removed from the work piece, the foot pedal 49 or the hand lever 51 may be actuated to raise the release member 43 and depress that pin 28 which is in engagement with the stop member 42. The bar 22 and the stop bar 35 may then be moved further to the left. This can be accomplished by pressing the work piece 18 against the stop bar 35.

When the work piece 18, the stop bar 35 and the bar 22 have moved two inches further to the left, the second pin 28 will engage the stop member 42 and again interrupt leftward movement of the bar 22 and associated parts. The second drilling operation may then be effected with assurance that the second drilled hole will be precisely two inches away from the first drilled hole, measured center to center. After completion of the machining operations on one work piece, the bar 22 may be returned to its right hand position without actuation of the release means since the legt 42a of the stop member 42 slopes upwardly and to the right, as clearly seen in Figs. 4 and 5, to permit a ratchet-like cooperation with the stop pins 28.

It will now be seen that apparatus constructed in accordance with the present invention may readily be attached to an existing machine tool, the only essential physical connection being the attachment of the guide member 20 to the bottom of the work table. The stop bar 35, being vertically and laterally adjustable, may readily be brought to the desired line of movement along the upper surface of the work table. It should be noted that the stop bar 35 and a portion of the stop arm 30 are the only portions of the apparatus which are arranged within the working area of the machine tool. Accordingly, the apparatus in no way obstructs the working area.

It has also been shown that the apparatus is readily adjustable to provide a large number of finely differentiated stop positions. Further in this connection, it should be noted that the bar 22 may be of very substantial length such that very widely spaced stop positions may be established. After the desired stop positions have been established by selective positioning of pins 28, the stop bar 35 and, hence, a work piece 18 are positively, accurately and reliably stopped in desired, predetermined, successive positions.

As will be apparent to those skilled in the art, apparatus constructed in accordance with the present invention is inherently economical to manufacture. Many of the parts may, for example, be stamped from heavy gauge sheet metal. Furthermore, the only precision work required in the construction of the apparatus is the drilling of the holes 27 which receive the pins 28. Substantial manufacturing tolerance may be permitted in the manufacture of all other parts of the apparatus without materially affecting the accuracy of the positioning of a work piece.

The apparatus may be very substantially modified in many respects without departing from the spirit of the invention. As has already been mentioned, the bar 22 may be of any desired length such that widely spaced stop positions may be provided. Provision of a wider bar 22 and employment of a large number of staggered rows of openings 27 will permit differentiation of stop positions to any desired degree of fineness.

Still further, the bar 22 and associated parts may be spring biased to the left such that the bar and associated parts move automatically to the next successive stop position upon operation of the release member 43. If desired, the foot pedal 49 may be connected by a simple pull cord or chain to the hand lever 51. In this connection, it should be noted that where the term "manual operation" is employed herein it is intended that it be interpreted broadly to include operation by hand or by foot.

Accordingly, while there has been described what is at present considered to be the preferred embodiment of the invention, it will be understood that various modifications may be made therein, and it is intended to cover in the appended claims all such modifications as fall within the true spirit and scope of the invention.

I claim:

1. In a machine tool having a work table, the combination comprising an elongated member slidably supported by said work table, a plurality of stop elements selectively positioned on said elongated member, each of said stop elements being movable with respect to said elongated member between a retracted position and a stop effecting position and being biased toward said stop effecting position, a stop member secured to said work table and engageable with successive ones of said stop elements in stop effecting position to prevent movement of said elongated member in one direction, release means secured to said work table adjacent said stop member and manually movable with respect to said work table between a retracted position and an actuated position, said release means when moved to said actuated position being engageable with only that one of said stop elements which may be engaging said stop member to move said stop element to retracted position, and means supported by said elongated member and extending over said work table to be engaged by a work piece supported on said work table.

2. In a machine tool having a work table, the combination comprising guide means secured to the bottom of said work table, an elongated member slidably supported by said guide means, a plurality of stop elements selectively positioned on said elongated member, each of said stop elements being movable with respect to said elongated member between a retracted position and a stop effecting position and being biased toward said stop effecting position, a stop member secured to said work table and engageable with successive ones of said stop elements in stop effecting position to prevent movement of said elongated member in one direction, release means secured to said work table adjacent said stop member and manually movable with respect to said work table between a retracted position and an actuated position, said release means when moved to said actuated position being engageable with only that one of said stop elements which may be engaging said stop member to move said stop element to retracted position, and means supported by said elongated member and extending over said work table to be engaged by a work piece supported on said work table.

3. Work positioning apparatus for use with a machine tool having a work table, said apparatus comprising guide means securable to the bottom of said work table, an elongated member slidably supported by said guide means, a plurality of stop elements selectively positioned on said elongated member, each of said stop elements being movable with respect to said elongated member between a retracted position and a stop effecting position and being biased toward said stop effecting position, a stop member secured to said work table and engageable with successive ones of said stop elements in stop effecting position to prevent movement of said elongated member in one direction, release means secured to said work table adjacent said stop member and manually movable with respect to said work table between a retracted position and an actuated position, said release means when moved to said actuated position being engageable with only that one of said stop elements which may be engaging said stop member to move said stop element to retracted position, and means supported by said elongated member and extending over said work table to be engaged by a work piece supported on said work table.

4. The combination as specified in claim 1 wherein said elongated member comprises a pair of rigid plates and an intermediate sheet of resilient material, and said stop elements comprise headed pins extending through openings in one of said plates and biased outwardly by said sheet of resilient material.

5. The combination as specified in claim 4 wherein the pin-receiving openings in said one plate are arranged in staggered lines, thereby to permit finely differentiated pin positions along the length of said elongated member.

6. The combination as specified in claim 1 wherein said stop member is pivotally mounted and is spring biased against said elongated member.

7. The combination as specified in claim 6 wherein said release means are mounted for pivotal movement about the same axis as said stop member, and spring means are arranged intermediate said release means and said stop member, said spring means urging said stop member toward said elongated member and urging said release means away from said elongated member.

8. In a machine tool having a work table, the combination comprising a guide member secured to the bottom of said work table, an elongated member slidably supported by said guide member, said elongated member comprising a pair of rigid plates and an intermediate sheet of resilient material, a plurality of headed pins extending through openings in one of said plates, each of said pins being movable inwardly of said elongated member to a retracted position and being biased outwardly to a stop effecting position by said sheet of resilient material, a frame detachably mounted on said guide member, a stop member pivotally mounted on said frame and engageable with successive ones of said pins in stop effecting position to prevent movement of said elongated member in one direction, release means mounted on said frame for pivotal movement about the same axis as said stop member and manually movable between a retracted position and an actuated position, said release means when moved to said actuated position being engageable with one of said pins engaging said stop member to move said pin to retracted position, spring means intermediate said release means and said stop member, said spring means urging said stop member toward said elongated member and urging said release means away from said elongated member, and means supported by said elongated member and extending over said work table to be engaged by a work piece supported on said work table.

9. In a machine tool having a work table, a control member movable with respect to said work table for limiting movement of a work piece in one direction along said work table, and two cooperating stop means, one connected to said work table and one connected to said control member, for limiting movement of said control member with respect to said work table, one of said stop means including an elongated member and a plurality of stop elements selectively positioned thereon, each of said stop elements being movable with respect to said elongated member between a retracted position and a stop effecting position and being biased toward said stop effecting position, the other of said stop means including a stop member engageable with successive ones of said stop elements in stop effecting position to limit relative movement of said two cooperating stop means and hence of said work table and said control member, said other stop means also including a release member movable with respect to said stop member between a retracted position and an actuated position, said release member when moved to said actuated position being engageable with only that one of said stop elements which may be engaged by said stop member to move said stop element to retracted position.

10. The combination as specified in claim 9 wherein said elongated member comprises a pair of rigid plates and an intermediate sheet of resilient material, and said stop elements comprise headed pins extending through openings in one of said plates and biased outwardly by said sheet of resilient material.

11. The combination as specified in claim 10 wherein the pin-receiving openings in said one plate are arranged in staggered lines, thereby to permit finely differentiated pin positions along the length of said elongated member.

12. The combination as specified in claim 9 wherein said stop member is pivotally mounted and is spring biased against said elongated member.

13. The combination as specified in claim 12 wherein said release means are mounted for pivotal movement about the same axis as said stop member, and spring means are arranged intermediate said release means and said stop member, said spring means urging said stop member toward said elongated member and urging said release means away from said elongated member.

References Cited in the file of this patent

UNITED STATES PATENTS

| | | |
|---|---|---|
| 1,956,883 | Verderber | May 1, 1934 |

FOREIGN PATENTS

| | | |
|---|---|---|
| 119,155 | Sweden | July 1, 1947 |